United States Patent [19]

Conway

[11] Patent Number: 4,462,917

[45] Date of Patent: Jul. 31, 1984

[54] METHOD AND COMPOSITIONS FOR FRACTURING SUBTERRANEAN FORMATIONS

[75] Inventor: Michael W. Conway, Duncan, Okla.

[73] Assignee: Halliburton Company, Duncan, Okla.

[21] Appl. No.: 423,573

[22] Filed: Sep. 27, 1982

[51] Int. Cl.³ ............................................. E21B 43/26
[52] U.S. Cl. ................. 252/8.55 R; 166/308; 252/315.3
[58] Field of Search ............... 252/8.55 R, 8.55 C, 252/315.3; 166/308

[56] References Cited

U.S. PATENT DOCUMENTS 3,888,312  6/1975  Tiner et al. ................. 166/308
3,898,165  8/1975  Ely et al. .................... 252/8.55
4,110,230  8/1978  Hessert et al. ............... 252/8.55

FOREIGN PATENT DOCUMENTS 793760  4/1958  United Kingdom .

OTHER PUBLICATIONS

Paul Lagally and Herta Lagally, "Atomistic Approach to the Crosslinking of Cellulose Fibers and Their Reaction with Fillers", TAPPI, vol. 39, No. 11, pp. 747–754, 1956.

Primary Examiner—Herbert B. Guynn
Attorney, Agent, or Firm—Robert A. Kent; Thomas R. Weaver

[57] ABSTRACT

An aqueous gel containing a retarded crosslinking composition comprising an organotitanate chelate, polyhydroxyl-containing compound and an aqueous fluid. The gel is useful for fracturing and placing propping agents within a subterranean formation. The gel has a high viscosity in the formation and has pumping characteristics in turbulent flow similar to those of the base gel.

21 Claims, No Drawings

METHOD AND COMPOSITIONS FOR FRACTURING SUBTERRANEAN FORMATIONS

BACKGROUND OF THE INVENTION

1. Field of the Invention

This invention relates to methods and compositions for the hydraulic fracturing of subterranean formations. It more particularly relates to methods and compositions for fracturing a subterranean formation penetrated by a well bore wherein a fluid composition having retarded crosslinking properties is injected into a formation through a suitable conduit at a rate and pressure sufficient to produce a fracture in the formation.

2. Brief Description of the Prior Art

In the drilling, completion and treatment of subterranean formations penetrated by well bores, viscous treating fluids commonly are utilized. In such operations, it often is desirable or necessary that the viscous treating fluids have relatively low initial viscosities, but when placed in the well bore or subterranean formation to be treated, the viscosities of the fluids increase. For example, in performing a subterranean fracturing process on a hydrocarbon-bearing formation to stimulate the production of hydrocarbons therefrom, a treating fluid which has a low viscosity and a low friction pressure when being pumped but which exhibits a high viscosity in the formation is desirable.

Generally, in the art of hydraulic fracturing, a fluid is introduced through a conduit, such as tubing or casing, disposed in the well bore into a formation sought to be fractured. The fluid is introduced at a rate and pressure sufficient to produce a fracture or fractures in the formation and to extend the produced fracture or fractures from the well bore into the formation. Upon the creation of the fracture or fractures, additional fracturing fluid containing solid proppant materials can be introduced into the fracture or fractures in the event the initial fluid did not contain any proppant. Following this treatment, the introduced fluid is recovered from the formation, but the proppant remains in the produced fracture or fractures to thereby prevent the complete closure thereof. The propped fracture creates a conductive channel extending from the well bore into the formation.

The conductivity of a propped fracture is effected by the particle size of the proppant material placed in the fracture. The particle size of the proppant that can be used depends upon the width to which the particular fracture can be opened during the introduction of the fracturing fluid. The fracture width normally is directly proportional to the viscosity of the fracturing fluid. In addition, the use of fracturing fluids having relatively high viscosities is advantageous since such fluids can support the proppant particles suspended therein without excessive settling. The use of such high viscosity fluids also permits the placement of relatively large-size proppant material in the fracture without a screenout occurring, that is, without the proppant bridging across the mouth of the fracture and preventing the introduction of proppant therein.

The use of desirably high viscosity fracturing fluids undesirably is accompanied by the problem of high friction losses usually encountered during the introduction of such fluids into a formation through the conduit, such as tubing or casing, disposed in the well bore. Since the pumping equipment and tubular goods are limited in capacity and operating pressure, the viscosity of the fluid which can be pumped also is limited. The viscosity of the fluid must be low enough that excessive friction losses and high well head pumping pressures are not encountered.

SUMMARY OF THE INVENTION

By the present invention there are provided methods of forming and using an improved viscous treating fluid. The treating fluid has an initial viscosity such that solid proppants can be suspended therein and carried thereby without excessive settling, but the viscosity of the fluid is not so high that excessive friction losses are encountered in pumping the fluid. Thus, according to this invention, an aqueous gel is provided which contains a retarded crosslinking composition capable of effecting a delayed crosslinking of the gelling agent in the aqueous gelled fluid to produce a fluid of significantly higher viscosity.

BRIEF DESCRIPTION OF THE PREFERRED EMBODIMENT

In accordance with the present invention an aqueous gel is provided comprising an aqueous fluid, a gelling agent, and a retarded crosslinking composition which is soluble in the aqueous fluid and capable of effecting a delayed crosslinking of the gelling agent. The aqueous gel has a non-Newtonian viscosity in laminar flow, such as in subterranean formations, of from about 100 centipoise to in excess of 1,000 centipoise at 170 sec$^{-1}$ shear rate. However, during introduction of the aqueous gel into the formation through a conduit in which the fluid is in turbulent flow, the viscosity is no greater than that imparted by the gelling agent before crosslinking. The aqueous gel of the present invention can carry great quantities of proppants into a formation sought to be fractured and can be introduced into the formation at suitably high rates with pumping equipment and tubular goods normally available at the wellhead.

The aqueous fluid utilized herein is defined as a water-alcohol solution having from about 0 to 80 percent and preferably from about 0 to 40 percent and most preferably from about 0 to 10 percent alcohol by volume of the solution. The preferred alcohols are alkanols having from 1 to 5 carbon atoms. Examples of alcohols believed to be useful in the aqueous fluid include methanol, ethanol, propanol, isopropanol, butanol, isobutanol, pentanol, furfuryl alcohol, ethylene glycol, and ethoxylated derivatives thereof.

The aqueous fluid is used to solvate the gelling agent. The solvated gelling agent is referred to hereinafter as a "base gel". The pH of the aqueous fluid can be adjusted, if necessary, to render the fluid compatible with the crosslinking agent used to crosslink the solvated gelling agent. The pH adjusting material can be added to the aqueous fluid before, after, or during addition of the gelling agent to the aqueous fluid.

The gelling agent useful in the present invention is selected from solvatable polysaccharides having molecular weights of at least 100,000. Examples of polysaccharides useful herein include the galactomannan gums, glucomannan gums, and their derivatives. Solvatable galactomannan and glucomannan gums are naturally occurring. The galactomannan gums and glucomannan gums also can be reacted with hydrophilic constituents to thereby produce gelling agents useful herein.

Solvatable polysaccharides having molecular weights of less than about 100,000 do not form crosslinked gels which are useful herein. The most preferred solvatable polysaccharides useful herein have molecular weights in the range of from about 200,000 to about 3,000,000.

Guar gum, locust bean gum, karaya gum, sodium carboxymethylguar, hydroxyethylguar, sodium carboxymethylhydroxyethylguar, hydroxypropylguar and sodium carboxymethylhydroxypropylguar are examples of gelling agents useful herein.

The preferred gelling agents are guar gum, hydroxypropylguar and sodium carboxymethylhydroxypropylguar. The most preferred gelling agent is hydroxypropylguar.

The gelling agent useful herein is present in the aqueous fluid in a concentration in the range of from about 0.2 to about 1.25 percent, preferably from about 0.2 to about 1.0 percent and most preferably from about 0.4 to about 0.7 percent by weight of the aqueous fluid. A gelling agent concentration of less than about 0.2 percent by weight of the aqueous fluid is not a sufficient quantity of gelling agent to permit effective crosslinking of the gel within the formation.

The discovery now has been made that the introduction of a retarded crosslinking composition comprising an admixture of a crosslinking compound, an aqueous fluid and a polyhydroxyl-containing compound to the base gel will provide a controllable delay in the rate of the crosslinking reaction. This retarded aqueous gel readily can be introduced through a conduit into a subterranean formation sought to be fractured as a result of its relatively low initial viscosity. The significant increase in the viscosity of the gel through crosslinking as it reaches the lower portion of the conduit or upon entry into the formation facilitates the fracturing process through a reduction in the hydraulic horsepower necessary to effect the fracture.

The retarded crosslinking composition of the present invention utilizes crosslinking compounds which feature the presence of titanium in the +4 oxidation state and are referred to as organotitanate chelates. An example of a titanium (IV)-containing crosslinking compound useful herein is titaniumammonium lactate chelate which is available from E. I. duPont de Nemours and Company, Inc. under the trademark TYZOR® LA. Another example of an organotitanate chelate useful herein is titaniumtriethanolamine chelate. Yet another example of an organotitanate chelate useful herein is titanium-acetylacetonate chelate. Titanium-triethanolamine chelate and titaniumacetylacetonate chelate also are available from E.I. duPont de Nemours and Company, Inc. under the trademarks TYZOR® TE and TYZOR® AA, respectively.

The crosslinking mechanism is not fully understood. However, it is believed that the titanium does not experience any sort of valence change during the crosslinking reaction.

The amount of crosslinking compound useful to crosslink the gelling agent of this invention is that which provides a titanium ion concentration in the range of from about 0.0005 percent to in excess of about 0.01 percent by weight of the aqueous gelled fluid. The preferred concentration is in the range of from about 0.0015 percent to about 0.01 percent by weight and, most preferably, from about 0.003 percent to about 0.006 percent by weight of the aqueous gelled fluid.

The rate of the unretarded crosslinking reaction is extremely rapid. At ambient temperature conditions, the organotitanate chelates comprising the crosslinking compound can crosslink the polysaccharides, comprising the gelling agent in as little as 10 to 15 seconds. When the aqueous fluid of the base gel is maintained at an elevated temperature, such as when preheated solutions are employed having a temperature above 100° F., the unretarded crosslinking reaction occurs almost instantaneously upon introduction of the crosslinking compound into the base gel. Such rapid reaction rates do not permit the gelled fluid to be pumped into the subterranean formation before a significant increase in the viscosity of the fluid occurs.

The surprising discovery now has been made that admixing the crosslinking compound with an aqueous fluid and a polyhydroxyl-containing compound in predetermined amounts produces a composition which can be used to delay the rate of the crosslinking reaction for a period of time sufficient to permit pumping of the aqueous gel through the conduit to the subterranean formation. Typically, this time can be from several minutes to hours in extremely deep formations.

The polyhydroxyl-containing compound useful in the present invention is selected from the polyhydroxyl-containing compounds having from 3 to 7 carbon atoms. Examples of compounds useful herein include glycerol, erythritol, threitol, ribitol, arabinitol, xylitol, allitol, altritol, sorbitol, mannitol, dulcitol, iditol, perseitol, and the like. The preferred polyhydroxyl-containing compounds for use in the invention are glycerol, sorbitol and perseitol. The compound can be in solid or liquid form when admixed with the aqueous and complexing compound of the present invention.

The polyhydroxyl-containing compound useful herein is admixed with an aqueous fluid and the crosslinking compound in an amount sufficient to provide a controlled delay in the crosslinking rate of the base gel. The particular amount of polyhydroxyl-containing compound necessary to delay the crosslinking reaction will depend upon the specific gelling agent, crosslinking compound and polyhydroxyl-containing compound utilized as well as the equipment available at the wellhead and tubular goods which will affect the pumping rate of the aqueous gel into the formation.

The aqueous fluid utilized to formulate the retarded complexing composition can comprise substantially any aqueous solution which does not adversely react with the gelling agent, crosslinking compound or polyhydroxyl-containing compound. Preferably, the aqueous fluid comprises water.

The retarded crosslinking composition is prepared by admixing the crosslinking compound, polyhydroxyl-containing compound and aqueous fluid in predetermined amounts. The constituents are admixed in a volumetric ratio of crosslinking compound to polyhydroxyl-containing compound to aqueous fluid in the range of from about 1:0.05:0.05 to about 1:10:10. Preferably, the volumetric ratio is in the range of from about 1:0.1:0.1 to about 1:4:4; and, most preferably, the volumetric ratio is about 1:0.5:0.5 to about 1:2:2. The constituents of the retarded crosslinking composition can be admixed in any order in any conventional mixing apparatus, such as for example, a batch mixer. When an aqueous-containing solution of the crosslinking compound is utilized, the aqueous portion is included in determining the total aqueous fluid content of the retarded crosslinking composition. The retarded crosslinking composition can be admixed with the aqueous gel in an amount of from about 0.1 gallon to about 0.5 gallon per 10 pounds of gelling agent.

Surprisingly, it has been found that the high temperature rheological properties of the aqueous gels formed with the retarded crosslinking composition of the present invention improve when the retarded crosslinking composition is "aged" prior to use. The term "aged" as used herein is intended to mean that the admixture comprising the retarded crosslinking composition is held in an appropriate container after formulation for a period of from a few minutes to over several weeks prior to use. Preferably, the retarded crosslinking composition is aged for from about 3 to about 12 weeks. It has been found that when the retarded crosslinking composition is aged at a generally constant temperature, the low-temperature crosslinking reaction rate declines while the high temperature viscosity of an aqueous gelled fluid crosslinked with the retarded crosslinking composition increases. When the retarded crosslinking composition is aged at a temperature above ambient temperature, such as for example, an elevated temperature such as from about 100° F. to 180° F., the rate of decline in the crosslinking reaction rate and rate of increase in the high temperature viscosity of the aqueous gelled fluid are enhanced. This permits the production of retarded crosslinking compositions having preselected properties by controlling the time and temperature of the aging.

Conventional propping agents can be employed with the fracturing fluid compositions of the present invention, examples of which are quartz sand grains, tempered glass beads, rounded walnut shell fragments, aluminum pellets, sintered bauxite, nylon pellets, and similar materials. Propping agents generally are used in concentrations in the range of from about 1 to about 10 pounds per gallon of the aqueous fluid; however, higher or lower concentrations may be used as required. The particle size of propping agent employed is a function of the nature of the formation to be fractured, the pressure required to produce the fracture, and pumping fluid flow rates available, as well as other known factors. However, particle sizes in the range of from about 200 to about 2 mesh on the U.S. Sieve Series scale can be employed in fracturing well formations with the compositions of the present invention.

The aqueous gel of the present invention can be prepared for use by mixing a predetermined quantity of the solvatable polysaccharide gelling agent with a quantity of aqueous fluid to form a solvated gel. Any conventional batch mixing apparatus can be employed for this purpose. After the gelling agent and aqueous fluid have been mixed for a time sufficient to dissolve the gelling agent and form the base gel, a quantity of the retarded crosslinking composition is mixed with the gel. The mixture then is pumped into the wellbore and into the formation as the retarded crosslinking reaction takes place. Proppant generally is added to the base gel prior to addition of the retarded crosslinking composition as the gel is introduced into the wellbore.

The aqueous gel of this invention can be made over a wide pH range and be useful for fracturing subterranean formations. The rate at which the crosslinking reaction proceeds at normal temperatures (about 60° F. to about 120° F.) is a function of the pH of the base gel. To assure that the crosslinking reaction takes place in the desired period of time, the pH of the aqueous fluid or of the base gel can be adjusted to a desired level within the range of from about pH 4.5 to about 10.5 and, preferably, to a level within the range of from about 6 to about 8 by the addition of a pH adjusting chemical. Since water from most sources is substantially neutral, the chemical or chemicals used for this purpose can be acids, acid buffers, mixtures thereof, or mixtures of acids and bases. Examples of suitable acids are hydrochloric acid, formic acid, acetic acid, fumaric acid, and phthalic acid. Examples of suitable buffers are potassium biphthalate, sodium hydrogen fumarate, and sodium bicarbonate. Examples of mixtures of acids and bases are fumaric acid and sodium fumarate, adipic acid and sodium bicarbonate, and fumaric acid and sodium carbonate.

A presently preferred process for fracturing a subterranean formation penetrated by a well bore comprises injecting down the well bore and into the formation, at a pressure sufficient to fracture the formation, a fluid comprising an aqueous gel which is prepared by adding from about 30 to about 70 pounds of gelling agent comprising hydroxypropylguar to each 1,000 gallons of aqueous fluid containing about 0 to about 10 percent by volume methanol. If desired, the pH of the aqueous fluid can be adjusted by the addition of a sufficient quantity of a buffering agent such as fumaric acid, formic acid or sodium bicarbonate. The base gel is introduced into the well bore and, as it is introduced, a sand proppant is introduced in an amount of from about 1 pound to about 8 pounds per gallon and the retarded crosslinking composition then is introduced. The retarded crosslinking composition is comprised of an admixture of the various commercially available organotitanate chelates or aqueous-alcohol dilutions thereof, a polyhydroxyl-containing compound and an aqueous fluid in a volumetric ratio of about 1:1:1 and is introduced at the rate of 0.3 gallon per each 10 pounds of gelling agent per each 1,000 gallons of aqueous fluid.

After the aqueous gel has been pumped into the subterranean formation and a fracture has been formed, it is desirable to convert the gel into a low viscosity fluid so that it can be recovered from the formation through the well bore. This conversion often is referred to as "breaking" the gel. There are various methods available for breaking the aqueous gel of the present invention. The gels of the present invention break after either or both the passage of time and prolonged exposure to high temperatures. However, it is desirable to be able to predict breaking time within relatively narrow limits. Therefore, breakers optionally can be included in the crosslinked gel of the present invention. Mild oxidizing agents are useful as breakers when a gel is used in a relatively high temperature formation, although formation temperatures of 200° F. or greater will generally break the gel relatively quickly without the aid of an oxidizing agent. A suitable oxidizing agent is ammonium persulfate. For crosslinked gels used at temperatures below about 140° F., enzymes are generally used as breakers. Suitable enzymes for such use are alpha and beta amylases, amyloglucosidase, oligoglucosidase, invertase, maltase, cellulase, and hemicellulase.

To further illustrate the present invention, the following examples are provided. It is to be understood that the examples are not intended to limit the scope of this invention.

EXAMPLE I

A base gel is prepared by admixing 50 pounds of hydroxypropylguar per 1,000 gallons of 2 percent potassium chloride solution together with 10 pounds of sodium bicarbonate and 2.5 pounds of fumaric acid per 1,000 gallons of solution. Several tests then are performed in which aliquotes of the base gel are admixed with quantities of the retarded crosslinking composition in a Jabsco pump operated at maximum RPM. The retarded crosslinking composition was prepared in various ratios and aged for various periods of time at 80° F.. The crosslinking compound comprised a solution consisting of 80 percent titanium-triethanolamine chelate in isopropyl alcohol. The polyhydroxyl-containing compound comprised glycerol and the aqueous fluid comprised water. The retarded crosslinking composition is admixed with the base gel in the Jabsco pump in a ratio of 0.3 gallon of retarded crosslinking composition per 1,000 gallons of solution in the aqueous gel. The base gel then is circulated through the pump to admix the retarded crosslinking composition with the base gel for a total of 10 minutes.

Thereafter a sample of the gelled fluid is placed in a Model 50 Fann viscometer and heated to the test temperature of 300° F. using the maximum heating rate under 300 psi nitrogen gas. Once the test temperature is reached, viscosity readings are taken every 15 minutes for two hours. The data is set forth in Table I, below.

TABLE I

| Test No. | Ratio Crosslinking Compound: Polyhydroxyl-Containing Compound: Aqueous Fluid | Duration of Aging, (Hrs.) | Apparent Viscosity cp 170 sec$^{-1}$ (Time at 300° F., Min.) | | | | | | | | |
|---|---|---|---|---|---|---|---|---|---|---|---|
| | | | 0 | 15 | 30 | 45 | 60 | 75 | 90 | 105 | 120 |
| 1 | 1:1:2 | 72 | 324 | 259 | 253 | 232 | 178 | 163 | 138 | 116 | 102 |
| 2 | 1:1:2 | 409 | 403 | 387 | 329 | 280 | 234 | 199 | 169 | 147 | 122 |
| 3 | 1:1:1 | 100 | 195 | 184 | 175 | 162 | 142 | 130 | 119 | 102 | 92 |
| 4 | 1:1:1 | 220 | 231 | 265 | 266 | 252 | 211 | 180 | 153 | 126 | 114 |
| 5 | 1:1:1 | 410 | 391 | 370 | 348 | 317 | 280 | 248 | 218 | 190 | 167 |
| 6 | 2:2:1 | 72 | 105 | 82 | 67 | 59 | 50 | 46 | 39 | 36 | 33 |
| 7 | 2:2:1 | 411 | 100 | 142 | 241 | 272 | 263 | 149 | 232 | 216 | 205 |

These tests clearly illustrate the controlled delay which can be effected by use of the retarded crosslinking composition of the present invention.

EXAMPLE II

A base gel is prepared by admixing 50 pounds of hydroxypropylguar per 1,000 gallons of water together with 2.5 pounds of fumaric acid and 10 pounds of sodium bicarbonate per 1,000 gallons of solution. Aliquotes of the base gel are admixed with a quantity of the retarded crosslinking composition containing various members of the group comprising the polyhydroxyl-containing compound. The crosslinking compound comprises a solution consisting of 80 percent titanium-triethanolamine chelate in isopropyl alcohol. The aqueous fluid comprises water. The volumetric ratio of crosslinking compound to polyhydroxyl-containing compound to aqueous is approximately 1:1:1, and the retarded crosslinking agent is aged about 1 hour. The crosslink time then is determined. The results of these tests are set forth in Table II, below.

TABLE II

| Test No. | Polyhydroxyl-Containing Compound | Crosslinking Time (Sec.) |
|---|---|---|
| 1 | —[1] | 21 |
| 2 | Perseitol | >300 |
| 3 | Sorbitol | >300 |
| 4 | Mannitol | 123 |
| 5 | Dulcitol | >300 |
| 6 | Xylitol | 259 |
| 7 | Adonitol | 58 |

[1]Crosslinking compound without polyhydroxyl-containing compound and aqueous fluid.

These results clearly illustrate the effectiveness of the retarded crosslinking compositions and the controlled delay that can be achieved by selecting various hydroxyl-containing compounds for use in the composition of the present invention.

While particular embodiments of the invention have been described, it is to be understood that such descriptions are presented for purposes of illustration only and that the invention is not limited thereto and that reasonable variations and modifications, which will be apparent to those skilled in the art, can be made without departing from the spirit or scope of the invention.

What is claimed is:
1. An aqueous gel comprising:
an aqueous fluid comprising a water-alcohol solution having from about 0 to 80 percent alcohol by volume;
a gelling agent comprising a solvatable polysaccharide having a molecular weight in excess of about 100,000 present in an amount sufficient to gel said aqueous fluid; and
a retarded crosslinking composition, present in an amount sufficient to crosslink at least a portion of said gelling agent, comprising an organotitanate chelate, a polyhydroxyl-containing compound comprising at least one member selected from the group consisting of glycerol, erythritol, threitol, ribitol, arabinitol, xylitol, allitol, altritol, sorbitol, mannitol, dulcitol, iditol, and perseitol and an aqueous fluid, said retarded crosslinking composition having been aged for a period of from about 3 to about 12 weeks prior to admixing with said solvatable polysaccharide and said consitiuents of said retarded crosslinking composition being present in a volumetric ratio, respectively, in the range of from about 1:0.05:0.05 to about 1:10:10.
2. The aqueous gel of claim 1 wherein said solvatable polysaccharide is selected from the group consisting of guar gum, locust bean gum, karaya gum, sodium carboxymethylguar, hydroxyethylguar, sodium carboxmethylhydroxyethylguar, hydroxpropylguar, and sodium carboxymethylhydroxypropylguar.
3. The aqueous gel of claim 1 wherein said crosslinking compound comprises at least one member selected from the group consisting of titanium-triethanolamine chelate, titanium-ammonium lactate chelate and titanium-acetylacetonate chelate.

4. The aqueous gel of claim 1 wherein said crosslinking compound, polyhydroxyl-containing compound and aqueous fluid of said retarded crosslinking composition are present in a volumetric ratio, respectively, in the range of from about 1:0.1:0.1 to about 1:4:4.

5. A process for fracturing a subterranean formation which comprises:
introducing into said formation an aqueous gel at a flow rate and pressure sufficient to produce a fracture in said formation, said aqueous gel being comprised of an aqueous fluid, a gelling agent comprising a solvatable polysaccharide having a molecular weight of a least about 100,000, a retarded crosslinking composition, present in an amount sufficient to crosslink at least a portion of said gelling agent, comprising organotitanate chelates having titanium in the +4 oxidation state, a polyhydroxyl-containing compound comprising at least one member selected from the group consisting of glycerol, erythritol, threitol, ribitol, arabinitol, xylitol, allitol, altritol, sorbitol, mannitol, dulcitol, iditol, and perseitol and an aqueous fluid which are present in said retarded crosslinking composition in a volumetric ratio, respectively, in the range of from about 1.0:0.05:0.05 to about 1:10:10 said retarded cross-linking composition having been aged for a period of from about 3 to about 12 weeks.

6. The process of claim 5 wherein said solvatable polysaccharide is selected from the group consisting of galactomannans, glucomannans, and derivatives thereof.

7. The process of claim 5 wherein said solvatable polysaccharide is selected from the group consisting of guar gum, locust bean gum, karaya gum, sodium carboxymethylguar, hydroxyethylguar, sodium carboxymethylhydroxyethylguar, hydroxypropylguar, and sodium carboxymethylhydroxypropylguar.

8. The process of claim 5 wherein said crosslinking compound comprises at least one member selected from the group consisting of titanium-triethanolamine chelate, titanium-ammonium lactate chelate and titanium-acetylacetonate chelate.

9. The process of claim 5 wherein said polyhydroxyl-containing compound comprises at least one member selected from the group consisting of glycerol, sorbitol, perseitol and mixtures thereof.

10. The process of claim 5 wherein said gelling agent is present in said aqueous fluid in a concentration in the range of from about 0.2 to about 1.25 percent by weight of said aqueous fluid.

11. The process of claim 5 wherein said aqueous fluid comprises a water-alcohol solution having in a range of from about 0 to about 80 percent alcohol by volume of solution.

12. The process of claim 11 wherein said alcohol is selected from alkanols having from 1 to 5 carbon atoms.

13. The process of claim 5 wherein said retarded crosslinking composition is present in the range of from about 0.1 gallon to about 0.5 gallon per 10 pounds of gelling agent.

14. The process of claim 5 wherein said crosslinking compound, polyhydroxyl-containing compound and aqueous fluid of said retarded crosslinking composition are present in a volumetric ratio, respectively, in the range of from about 1:0.1:0.1 to about 1:4:4.

15. A process for hydraulically fracturing a subterranean formation penetrated by a well bore which comprises:
preparing a base gel by mixing an aqueous fluid comprising a water-alcohol solution having in a range of from about 0 to about 80 percent alcohol by volume of solution with a gelling agent selected from solvatable polysaccharides having a molecular weight of at least about 100,000;
admixing a retarded crosslinking composition with said gelling agent in an amount sufficient to crosslink at least a portion of said gelling agent, said retarded crosslinking composition comprising:
(i) a crosslinking compound comprising an organotitanate chelate having titanium in the +4 oxidation state,
(ii) a polyhydroxyl-containing compound comprising at least one member selected from the group consisting of glycerol, erythritol, threitol, ribitol, arabinitol, xylitol, allitol, altritol, sorbitol, mannitol, dulcitol, iditol and perseitol and
(ii) an aqueous fluid present in said retarded crosslinking composition in a ratio, respectively, in the range of from about 1:0.05:0.05 to about 1:10:10 with said base gel, said retarded crosslinking composition having been aged for a period of from about 3 to about 12 weeks,
said retarded crosslinking composition being capable of delaying the reaction rate of said crosslinking compound with said gelling agent of said base gel;
introducing said base gel containing said retarded crosslinking composition into said well bore;
permitting said base gel and said crosslinking compound to react after a controllable period of time to form a crosslinked aqueous gel, at least a portion of the delay in the rate of said reaction resulting from the presence of said polyhydroxyl-containing compound and aqueous fluid in said retarded crosslinking composition; and
introducing said crosslinked aqueous gel into said formation from said well bore at a flow rate and pressure sufficient to produce a fracture in said formation.

16. The process of claim 15 wherein said solvatable polysaccharide is selected from the group consisting of guar gum, locust bean gum, karaya gum, sodium carboxymethylguar, hydroxyethylguar, sodium carboxymethylhydroxyethylguar, hydroxypropylguar, and sodium carboxymethylhydroxypropylguar.

17. The process of claim 15 wherein said crosslinking compound comprises at least one member selected from the group consisting of titanium-triethanolamine chelate, titanium-ammonium lactate chelate and titanium-acetylacetonate chelate.

18. The process of claim 15 wherein said polyhydroxyl-containing compound comprises at least one member selected from the group consisting of glycerol, sorbitol, perseitol and mixtures thereof.

19. The process of claim 15 wherein said gelling agent is present in said aqueous fluid in a concentration in the range of from about 0.2 to about 1.25 percent by weight of said aqueous fluid.

20. The process of claim 15 wherein said retarded crosslinking composition is present in the range of from about 0.1 gallon to about 0.5 gallon per 10 pounds of gelling agent.

21. The process of claim 15 wherein said crosslinking compound, polyhydroxyl-containing compound and aqueous fluid of said retarded crosslinking composition are present in a volumetric ratio, respectively, in the range of from about 1:0.1:0.1 to about 1:4:4.

* * * * *